(12) United States Patent
Ojima et al.

(10) Patent No.: US 11,290,796 B2
(45) Date of Patent: Mar. 29, 2022

(54) SPEAKER DEVICE AND DISPLAY DEVICE

(71) Applicant: SHARP KABUSHIKI KAISHA, Sakai (JP)

(72) Inventors: Yoshihiro Ojima, Sakai (JP); Tohru Hayase, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/917,842

(22) Filed: Jun. 30, 2020

(65) Prior Publication Data

US 2021/0112322 A1 Apr. 15, 2021

Related U.S. Application Data

(60) Provisional application No. 62/914,740, filed on Oct. 14, 2019.

(51) Int. Cl.
*H04R 1/02* (2006.01)
*H04R 9/06* (2006.01)
*H04N 5/64* (2006.01)

(52) U.S. Cl.
CPC ............. *H04R 1/028* (2013.01); *H04N 5/642* (2013.01); *H04R 2499/15* (2013.01)

(58) Field of Classification Search
CPC ............................. H04R 1/1041; H04N 4/029
See application file for complete search history.

(56) References Cited

U.S. PATENT DOCUMENTS

| | | | | |
|---|---|---|---|---|
| 4,196,792 A | * | 4/1980 | Grieves | H04R 1/2826 181/156 |
| 5,147,986 A | * | 9/1992 | Cockrum | H04R 1/2842 181/145 |
| 2005/0094837 A1 | * | 5/2005 | Parker | H04R 9/022 381/355 |
| 2007/0195984 A1 | * | 8/2007 | Yang | H04R 1/1075 381/372 |
| 2008/0060732 A1 | * | 3/2008 | Rumbaugh | B60C 5/24 152/157 |
| 2012/0177238 A1 | * | 7/2012 | Enamito | H04R 1/2819 381/349 |
| 2016/0202224 A1 | * | 7/2016 | Lloyd | G05D 7/01 73/865.8 |
| 2018/0091892 A1 | * | 3/2018 | Taylor | H04R 1/2811 |
| 2018/0091910 A1 | * | 3/2018 | Porter | H04R 29/001 |
| 2018/0139543 A1 | * | 5/2018 | Clerici | H04R 19/04 |
| 2019/0297413 A1 | * | 9/2019 | Uchida | H04R 1/025 |
| 2020/0027437 A1 | * | 1/2020 | Park | H04R 1/288 |
| 2020/0314546 A1 | * | 10/2020 | Aleksandrov | H04R 1/025 |

FOREIGN PATENT DOCUMENTS

| | | |
|---|---|---|
| JP | H04280600 A | 10/1992 |
| JP | H09207 U | 4/1997 |
| JP | 2006-211195 A | 8/2006 |

* cited by examiner

*Primary Examiner* — Simon King
(74) *Attorney, Agent, or Firm* — ScienBiziP, P.C.

(57) ABSTRACT

A speaker device includes: a speaker unit configured to output a sound; a speaker box covering at least a part of a back surface of the speaker unit; and a duct comprising a first opening that is open within the speaker box, and a second opening opposite the first opening, the duct communicating together an interior and exterior of the speaker box via the first and second openings, wherein the duct further comprises a third opening disposed in a midway location between the first and second openings.

12 Claims, 12 Drawing Sheets

SPEAKER DEVICE AND DISPLAY DEVICE

CROSS-REFERENCE TO RELATED APPLICATION

The present application claims priority from Provisional Application No. 62/914,740, the content to which is hereby incorporated by reference into this application.

TECHNICAL FIELD

The present invention relates to a speaker device and a display device.

BACKGROUND ART

A bass-reflex speaker device is conventionally known, which is a speaker device that amplifies a low-frequency sound using a bass-reflex box (c.f., Document 1: Japanese Patent Application Laid-Open No. 2006-211195). The speaker device in Document 1 includes a speaker unit, a box equipped with the speaker unit, a bass-reflex port secured to the box, and a breathable, elastic body disposed in the opening of the bass-reflex port. The speaker device in Document 1, which includes an elastic body, reduces high-frequency components in an air noise (i.e., a sound of airburst) that occurs at the bass-reflex port.

SUMMARY OF INVENTION

Unfortunately in Document 1, a natural vibration of an air column occurs in the bass-reflex port (i.e., duct), thus possibly outputting an abnormal sound, which is a resonance sound (i.e., tube resonance sound) resulting from the natural vibration. For instance, a tube resonance sound includes a sound in a mid- to high-range of frequency, which is perceptible by humans. For this reason, the speaker device in Document 1, although including an elastic body for reducing high-frequency components, can fail to sufficiently reduce a tube resonance sound including components in a mid- to high-range of frequency.

It is an object of one aspect of the present invention to provide a speaker device and a display device that are capable of reducing a tube resonance sound.

A speaker device according to a first aspect of the present invention includes the following: a speaker unit that outputs a sound; a speaker box covering at least a part of the back surface of the speaker unit; and a duct having a first opening that is open within the speaker box, and a second opening opposite the first opening. The duct communicates together the interior and exterior of the speaker box via the first and second openings. The duct further includes a third opening disposed in a midway location between the first and second openings.

The speaker device according to a second aspect of the present invention is configured, in the first aspect, such that the third opening is disposed in the midway location that corresponds to where a vibration node of a natural vibration of an air column that occurs within the duct is located.

The speaker device according to a third aspect of the present invention is configured, in the second aspect, such that the third opening is disposed in the midway location that corresponds to where a vibration node of a fundamental vibration of the natural vibration of the air column is located.

The speaker device according to a fourth aspect of the preset invention is configured, in any one of the first to third aspects, such that the third opening is disposed in a center portion between the first and second openings.

The speaker device according to a fifth aspect of the preset invention further includes, in any one of the first to fourth aspects, a cover covering at least a part of the third opening.

The speaker device according to a sixth aspect of the present invention is configured, in the fifth aspect, such that the duct has a dent dented from the interior toward exterior of the duct, that the third opening is disposed at the bottom of the dent, and that the cover is disposed in the dent.

The speaker device according to a seventh aspect of the present invention is configured, in the fifth or sixth aspect, such that the cover is a breathable member.

The speaker device according to an eighth aspect of the present invention is configured, in the seventh aspect, such that the cover is a nonwoven fabric.

The speaker device according to a ninth aspect of the preset invention is configured, in any one of the first to eighth aspects, such that the third opening is open within the speaker box.

A speaker device according to a tenth aspect of the present invention includes the following: a speaker unit that outputs a sound; a speaker box covering at least a part of the back surface of the speaker unit; a duct having a first opening that is open within the speaker box, and a second opening opposite the first opening; and a pressure regulating mechanism disposed in a midway location between the first and second openings of the duct. The duct communicates together the interior and exterior of the speaker box via the first and second openings. The pressure regulating mechanism reduces a change in the internal pressure of the duct in the midway location.

A display device according to an eleventh aspect of the present invention includes the speaker device according to any one of the first to tenth aspects, and a display unit that displays an image.

DESCRIPTION OF PREFERRED EMBODIMENTS

A speaker device according to one aspect of the present invention will be described with reference to the drawings. Some of the drawings define the horizontal direction of a display device placed properly, as an X-direction; the vertical direction of the same, as a Y-direction; and the depth direction of the same, as a Z-direction. In addition, some of the drawings define the right side of the display device as a +X-direction; the upper side of the same, as a +Y-direction; and the front side (i.e., display surface) of the same, as a +Z-direction. The present invention is not limited to configurations that will be described in the following preferred embodiments. The present invention can be modified within its technical scope, that is, within a configuration where the present invention can exert the same effect.

First Preferred Embodiment

Figure 1:
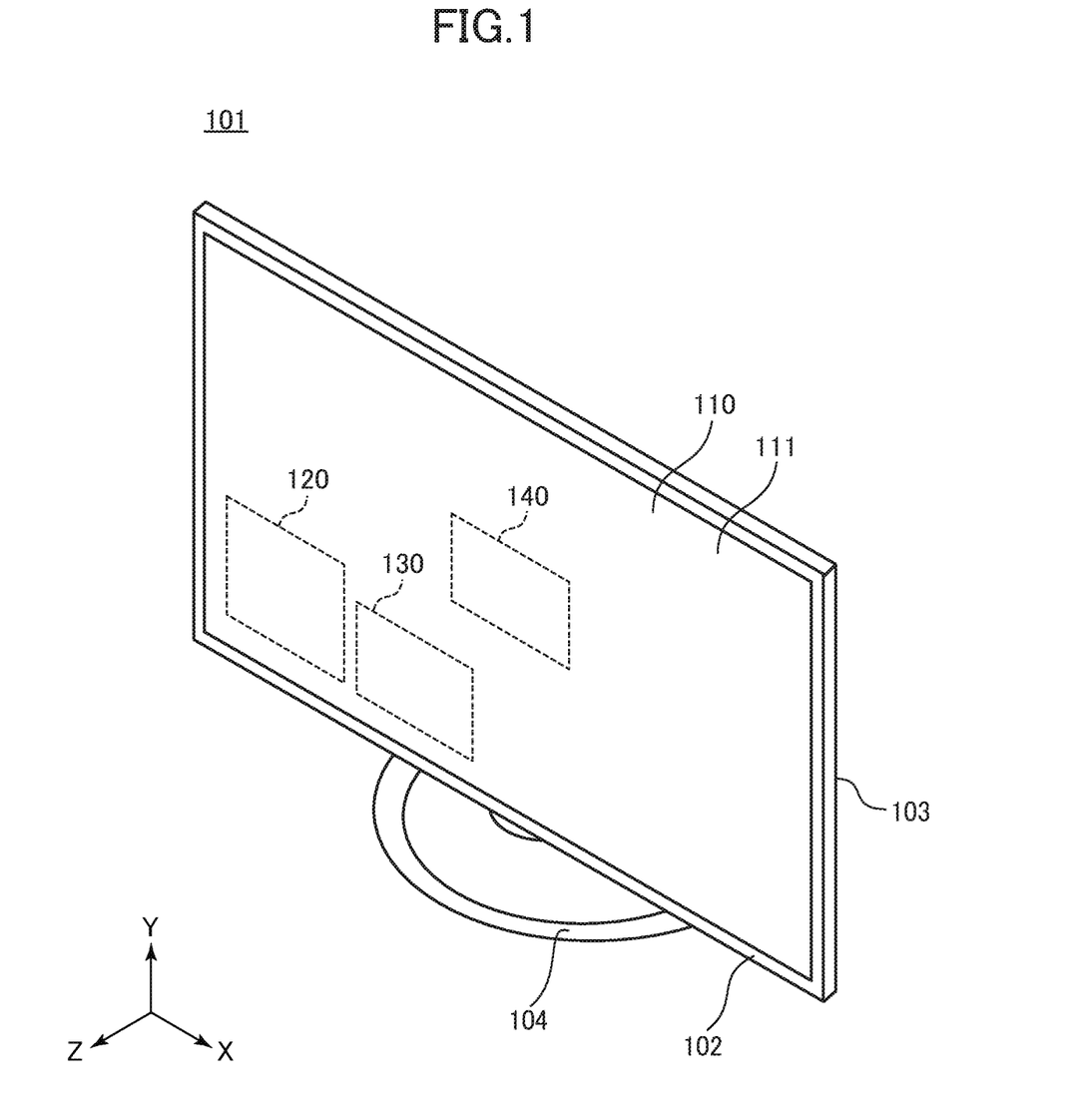
FIG. 1 schematically illustrates one example of a television set that includes a display device according to a first preferred embodiment.

The following describes a first preferred embodiment of a speaker device according to one aspect of the present invention. FIG. 1 schematically illustrates the appearance configuration of a television set that includes the speaker device and a display device, according to the first preferred embodiment. As illustrated in FIG. 1, a television set 101 includes a display unit 110, a receiver 120, a signal processor 130, and a speaker device 140. The display device at least includes the display unit 110 and speaker device 140.

The television set 101 includes a front cabinet 102 on the front side (or in the +Z-direction), and a rear cabinet 103 on the back side (or in the −Z-direction). The front cabinet 102 is a casing in the form of a frame, and is disposed over the perimeter of the display unit 110 from the front (or the +Z-direction). The rear cabinet 103 is disposed at the rear of the display unit 110 (or in the −Z-direction), and covers the back surface of the display unit 110, the receiver 120, the signal processor 130, and the speaker device 140.

The television set 101 is disposed in a predetermined place while being supported by a stand 104, or is disposed on a wall while being secured by a hook not shown, for instance. At this time, the display unit 110 is disposed with its display surface 111 oriented forward (or in the +Z-direction) for instance.

The display unit 110 has the display surface 111 for image display. The display unit 110 is a liquid-crystal display for instance that includes a liquid-crystal panel and a backlight. The display unit 110 includes, for instance, a chassis (not shown) supporting the liquid crystal panel, backlight, and other components from behind (or from the −Z-direction). The chassis has a back surface (i.e., surface in the −Z-direction) on which the receiver 120, signal processor 130, and speaker device 140 are disposed. The longer-side, shorter-side, and thickness directions of the display unit 110 respectively correspond to the X-direction, Y-direction, and Z-direction.

The receiver 120 is a circuit substrate on which a reception circuit is mounted. The receiver 120 receives a television broadcast from outside via an antenna not shown, and outputs a broadcast signal based on the received television broadcast.

The signal processor 130 is a circuit substrate on which a signal processing circuit is mounted. The signal processor 130 performs predetermined signal processing on the broadcast signal that has been output by the receiver 120, and then outputs the signal as video data. The video based on the video data that has been output by the signal processor 130 is displayed on the display surface 111 of the display unit 110.

Configuration of Speaker Device

Figure 2:
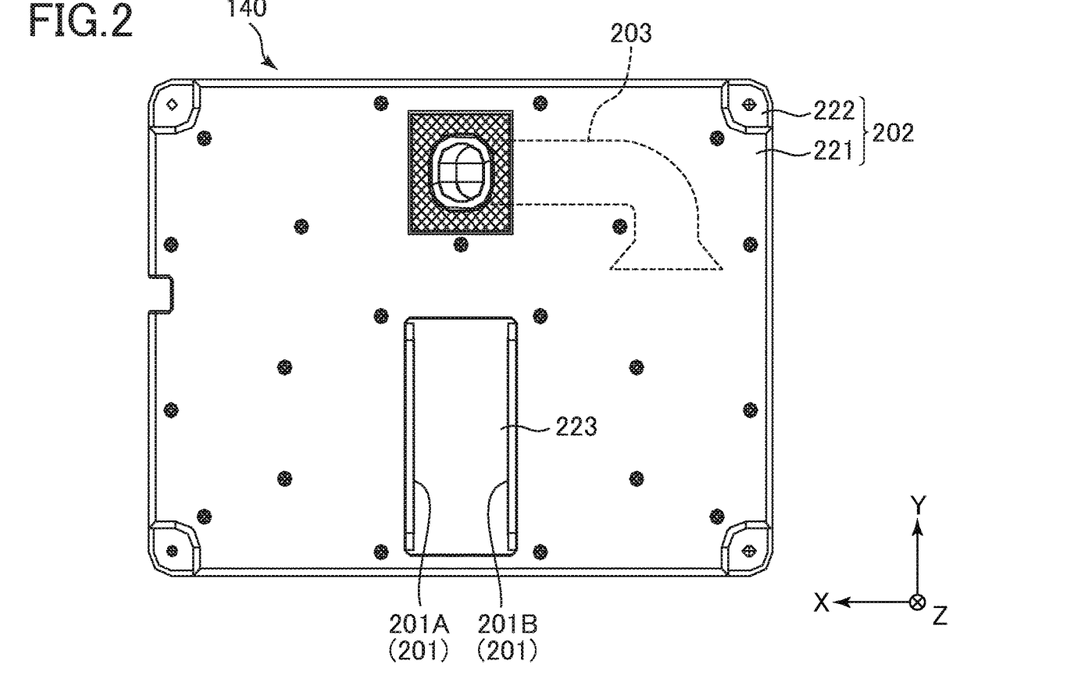
FIG. 2 schematically illustrates the configuration of a speaker device according to the first preferred embodiment.
Figure 3:
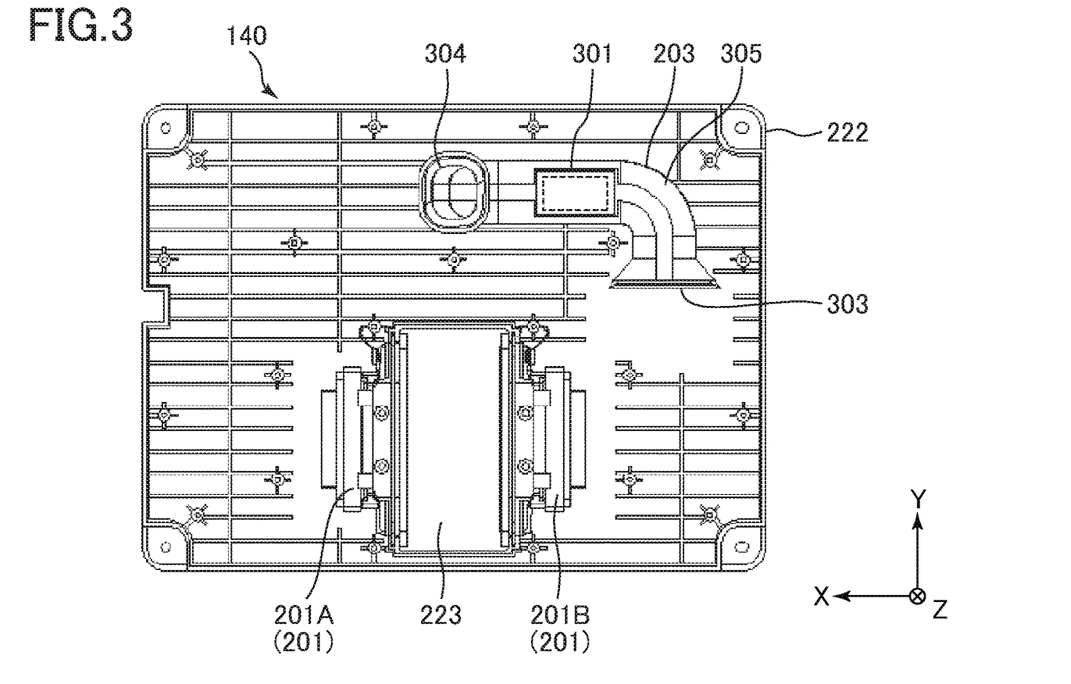
FIG. 3 schematically illustrates the inner configuration of the speaker device according to the first preferred embodiment.

FIG. 2 schematically illustrates the configuration of the speaker device 140 viewed from the −Z-direction. FIG. 3 schematically illustrates the inner configuration of the speaker device 140 viewed from the −Z-direction. FIG. 3 schematically illustrates the configuration of the speaker device 140 with a front case 221 of its speaker box 202 (which will be described later on) removed therefrom. The speaker device 140 is a bass-reflex speaker device. The speaker device 140 amplifies, by Helmholtz resonance, the bass range of a sound that is output from the back surface of a speaker unit 201. It is noted that multiple speaker devices 140 may be provided for the display unit 110. It is also noted that the speaker device 140 may be disposed in the display unit 110 so as to be oriented in a direction different from that described in this preferred embodiment.

The speaker device 140 includes the speaker unit 201, the speaker box 202, and a duct 203. The duct 203 is disposed within the speaker box 202, and includes a pressure regulating mechanism 301 (c.f., FIG. 3). The details will be described later on. The following details the speaker device 140.

The speaker unit 201 converts an electric signal into a sound, thus outputting the sound. The speaker unit 201 is attached to the speaker box 202. In the example in FIG. 2, the speaker device 140 includes a first speaker unit 201A and a second speaker unit 201B. The first speaker unit 201A and second speaker unit 201B constitute the speaker unit 201. The speaker unit 201A and second speaker unit 201B are provided in such a manner that a sound is output toward the X-direction, and that their sound output surfaces face each other. The first speaker unit 201A is provided so as to output a sound toward the −X-direction. The second speaker unit 201B is provided so as to output a sound toward the +X-direction.

The speaker unit 201 is attached to the speaker box 202. The speaker box 202 covers the speaker unit 201 from the back of the sound output surfaces of the speaker unit 201. The speaker box 202 includes, for instance, the front case 221 (c.f., FIG. 2) and a rear case 222 (c.f., FIG. 3). The front case 221 and rear case 222 are combined together in the Z-direction, thus constituting the speaker box 202. In this preferred embodiment, the front case 221 is located, by way of example only, in the −Z-direction with respect to the rear case 222. In other words, the speaker device 140 is disposed in such a manner that the front case 221 is adjacent to the rear cabinet 103 and that the rear case 222 is adjacent to the display unit 110.

The speaker box 202 has a penetrating portion 223 extending through the speaker box 202 in the Z-direction. The penetrating portion 223 has two side surfaces intersecting in the X-direction. Each side surface has an opening for placing the speaker unit 201. In other words, the first speaker unit 201A is disposed on one of the two side surfaces in the +X-direction. In addition, the second speaker unit 201B is disposed on the other side surface in the −X-direction. The speaker unit 201 is covered with the speaker box 202 from the back of its sound output surfaces. The sound output surfaces of the speaker unit 201 are exposed from openings on both sides of the penetrating portion 223 in the Z-direction to the outside of the speaker box 202.

The duct 203 has a first opening 303 that is open within the speaker box 202, and a second opening 304 opposite the opening 303. The duct 203 communicates together the interior and exterior of the speaker box 202 via the first opening 303 and second opening 304. The first opening 303 at one of the ends of the duct 203 is open in the −Y direction within the speaker box 202. The second opening 304 at the other end of the duct 203 is connected to the opening of the front case 221.

Figure 4:
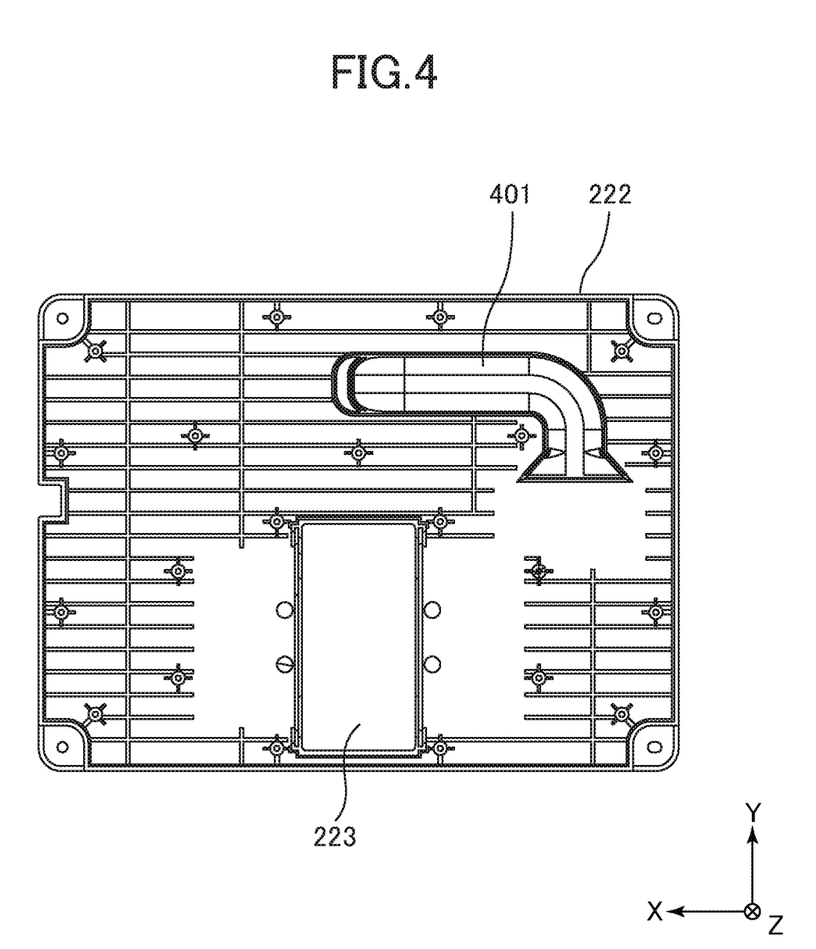
FIG. 4 schematically illustrates the configuration of a rear case of the speaker device according to the first preferred embodiment.

FIG. 4 schematically illustrates the configuration of the rear case 222 viewed from the −Z-direction. The duct 203 has a front portion 305 (c.f., FIG. 3) and a rear portion 401 (c.f., FIG. 4). The rear portion 401 mainly constitutes the surface of the duct 203 in the +Z-direction (also referred to as a bottom surface). The rear portion 401 is located where the duct 203 is placed, on the inner surface of the rear case 222, that is, where the front portion 305 is placed. The rear portion 401 has a groove at its outer edge when viewed from the −Z-direction for instance. The end of the front portion 305 in the +Z-direction is inserted into the groove of the rear portion 401, and the front portion 305 is accordingly secured to the rear case 222.

The front portion 305 constitutes a surface other than its bottom surface. The front portion 305 is attached to the rear case 222 to cover the rear portion 401 from the −Z-direction. The front portion 305 extends from one of the ends of the duct 203 toward the +Y-direction, followed by curving toward the +X-direction to extend in the X-direction, followed by curving toward the −Z-direction to extend to the other end of the duct 203 in the Z-direction.

The speaker device 140 is designed to output, from the opening of the duct 203, a Helmholtz resonance sound having a desired, natural frequency. Here, the natural frequency of a Helmholtz resonance is determined based on the volume of the speaker box 202, the cross-sectional area of the duct 203, and the length of the duct 203 (i.e., duct length). In other words, the speaker box 202 and duct 203 are provided in such a manner that the natural frequency of the Helmholtz resonance equals a desired value.

Figure 5:
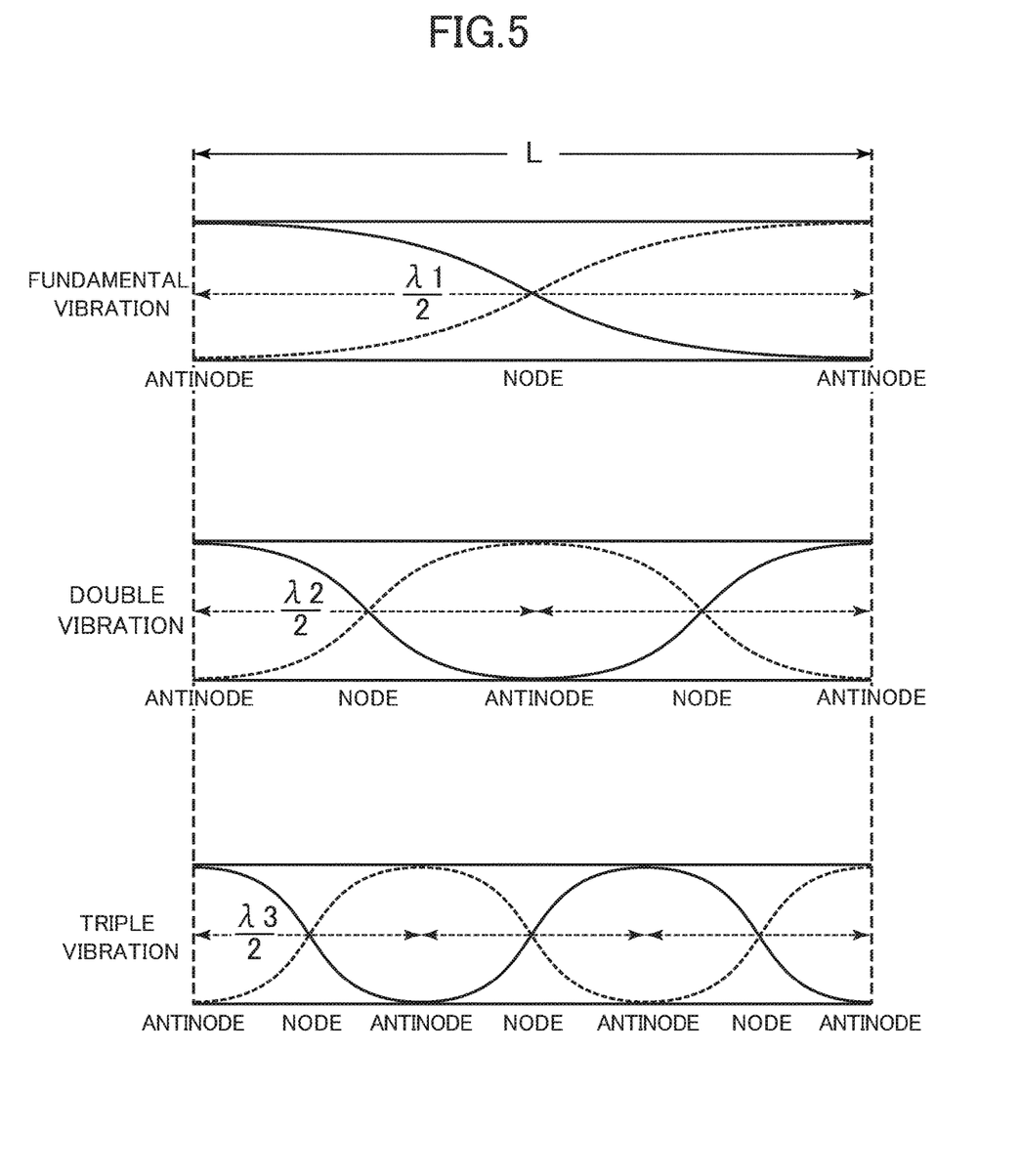
FIG. 5 schematically illustrates natural vibrations of an air column.

The speaker device 140 preferably outputs only a Helmholtz resonance sound from the duct 203. In some cases however, a natural vibration of an air column (i.e., tube resonance sound) occurs inside the duct 203, as illustrated in FIG. 5 for instance, and a resonance sound (i.e., tube resonance sound) of the air column is output from the duct 203 as an abnormal sound.

Here, the duct 203 is an open tube with its both ends open. As illustrated in FIG. 5, a natural vibration of an open tube occurs in the duct 203. The wavelength of the aforementioned tube resonance sound depends on the duct length. Let n be a natural number, let L be the duct length, and let λn be the wavelength of an $n^{th}$ order of natural vibration of an air column resulting from tube resonance. Accordingly, $λn=2L/n$ is satisfied. For instance, a wavelength λ1 of a fundamental vibration is 2L, a wavelength λ2 of a double vibration (i.e., $2^{nd}$-order harmonic) is L, and a wavelength λ3 of a triple vibration (i.e., $3^{rd}$-order harmonic) is 3L/2. A tube resonance sound resulting from a fundamental vibration typically has a sound pressure greater than that of an $n^{th}$-order harmonic. In addition, the sound pressure of the $n^{th}$-order harmonic decreases along with increase in order.

As described above, the speaker device 140 includes the pressure regulating mechanism 301 in the duct 203. The pressure regulating mechanism 301 is disposed in a midway location between one end and the other end of the duct 203. The pressure regulating mechanism 301 reduces a change in the duct internal pressure in the midway location. Accordingly, the sound pressure of the tube resonance sound can be reduced.

Here, both ends of the duct 203 are open, and correspond to where an antinode of the natural vibration of the air column (i.e., tube resonance) is located. The amount of pressure fluctuation inside the duct 203 caused by tube resonance is typically minimum at the antinode in the tube resonance. The pressure regulating mechanism 301 is disposed in a midway location between the first opening 303 and second opening 304 of the duct 203. The pressure regulating mechanism 301 thus prevents fluctuation in the internal pressure of the duct 203, thereby preventing tube resonance and reducing the sound pressure level of the tube resonance sound.

Figure 6:
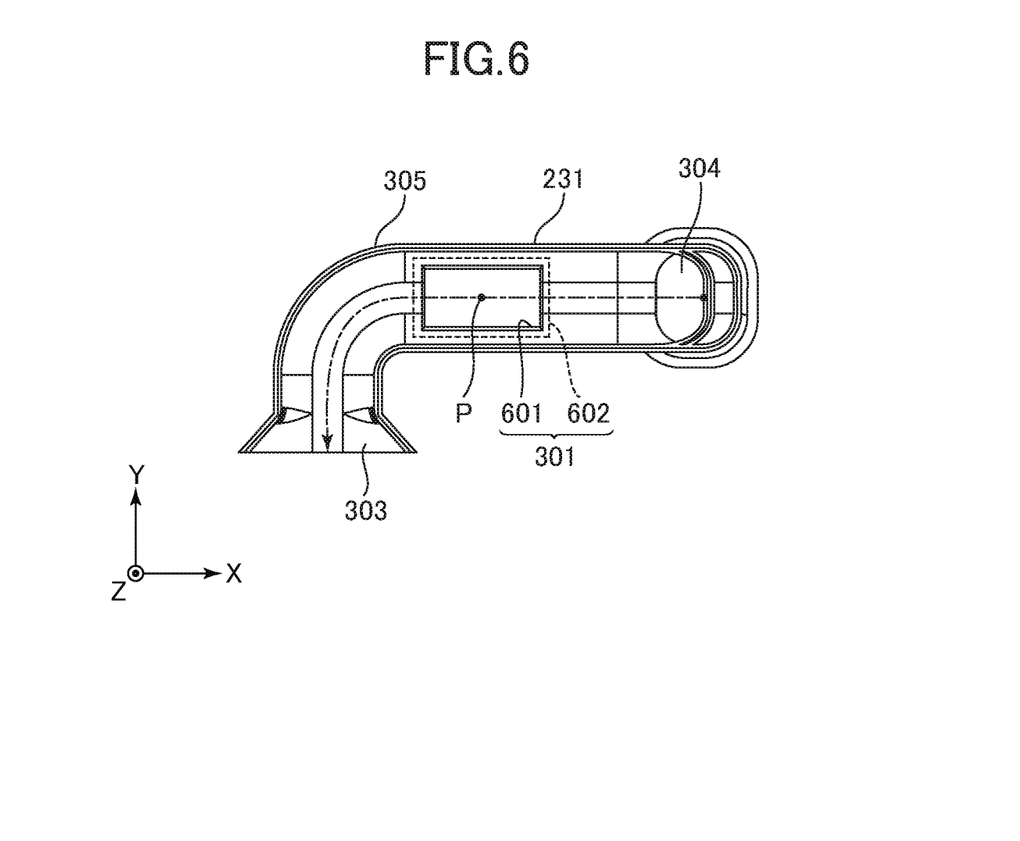
FIG. 6 schematically illustrates the configuration of a front portion constituting a duct according to the first preferred embodiment.
Figure 7:
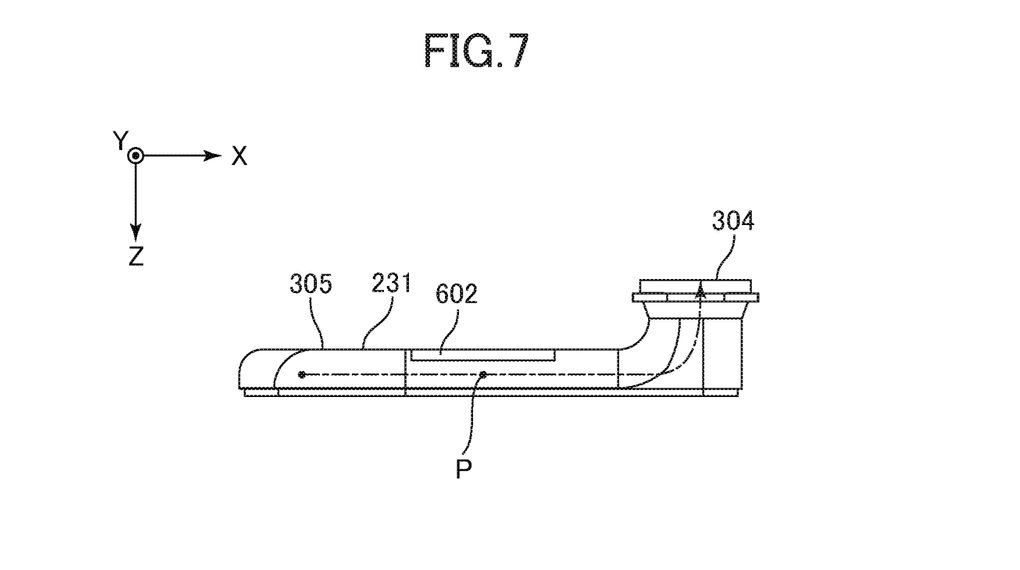
FIG. 7 schematically illustrates the configuration of the front portion constituting the duct according to the first preferred embodiment.

FIG. 6 schematically illustrates the configuration of the front portion 305 viewed from the +Z-direction. FIG. 7 schematically illustrates the configuration of the front portion 305 viewed from the +Y-direction. The pressure regulating mechanism 301 has, for instance, an opening 601 (i.e., third opening) disposed in the front portion 305 of the duct 203, and a breathable member 602 covering the opening 601. FIGS. 6 and 7 each illustrate a dot-dashed line denoting a virtual line passing through the center of the duct 203 (this line is the centerline of the duct) between one end (i.e., the first opening 303) and the other end (i.e., second opening 304) of the duct 203. In addition, the alphabet P in these drawings denotes a middle location of the duct centerline between the first opening 303 and second opening 304.

The opening 601 penetrates, in the Z-direction, the surface of the front portion 305 in the +Z-direction in the midway location between one end and the other end. The opening 601 is rectangular in plan view in the Z-direction, for instance. The opening 601 may have any shape, including a polygon, circle, ellipse, and oval. Along with a change in the internal pressure of the duct 203, the opening 601 allows air to pass inside and outside the duct 203. Providing the opening 601 can prevent fluctuation in the internal pressure resulting from tube resonance. In this preferred embodiment, the opening 601 is preferably large enough to, along with a change in the internal pressure of the duct 203, allow air to pass inside and outside the duct 203 without substantial drag.

The breathable member 602 is breathable to such a degree as to let air pass through when tube resonance causes a pressure difference between the inside and outside of the duct 203. The breathable member 602 is a nonwoven fabric for instance. The use of a nonwoven fabric facilitates breathability adjustment by regulating, for instance, its thickness and fiber density as appropriate. The breathable member 602 is not limited to a nonwoven fabric. Examples of the breathable member 602 usable include felt, paper, woven cloth, a sponge (i.e., spongy member).

Here, when the duct 203 has, in its midway location, an opening that is not covered with the breathable member 602, this opening location is an open end, thus shortening the effective length of the duct 203 relating to Helmholtz resonance in some cases. As described above, the opening 601 is large enough to let air pass inside and outside the duct 203 without substantial drag. Accordingly, when the opening 601 is not covered with the breathable member 602, the location of the opening 601 is an open end, thus reducing, by almost half, the effective length of the duct 203 relating to Helmholtz resonance. The natural frequency of a Helmholtz resonance changes from its designed value. In contrast, when the opening 601 is covered with the breathable member 602, the location of the opening 601 is not an open end of the duct 203. This can prevent a change in the natural frequency of a Helmholtz resonance, that is, a change in the acoustic properties of the speaker device 140.

The pressure regulating mechanism 301 is disposed in a location that corresponds to where a node (c.f., FIG. 5) of a natural vibration of an air column that occurs in the duct 203 is located. In this preferred embodiment, the opening 601 is disposed in a location including the location of the node in the natural vibration of the air column. For instance, when viewed from the Z-direction, the opening 601 is disposed in a location superposed on where the node is located. The node location has a larger amount of pressure fluctuation than other locations. Hence, placing the pressure regulating mechanism 301 in the node location of the natural vibration can reduce a tube resonance sound more suitably.

The pressure regulating mechanism 301 is located in a location that corresponds to where a node of a fundamental vibration of the natural vibration of the air column that occurs in the duct 203 is located. For instance, when viewed from the Z-direction, the opening 601 is located in a location including the node of the fundamental vibration. In other words, the pressure regulating mechanism 301 is disposed in a center portion between the first opening 303 and second opening 304 of the duct 203. For instance, the opening 601 is disposed in a location including the center position P of the duct 203 (c.f., FIGS. 6 and 7), when viewed from the Z-direction. The fundamental vibration of the natural vibration has a sound pressure greater than that of a harmonic. Hence, placing the pressure regulating mechanism 301 in the node location of the fundamental vibration can reduce a tube resonance sound more suitably.

The opening 601 of the pressure regulating mechanism 301 is open within the speaker box 202. This configuration can prevent a sound, if any, which occurs when air passes through the opening 601 (this sound is called an air-pass sound), from leaking outside the speaker box 202. Consequently, the air-pass sound can be less likely to go outside the speaker box 202, by extension, outside the rear cabinet of the television set 101.

Figure 8:
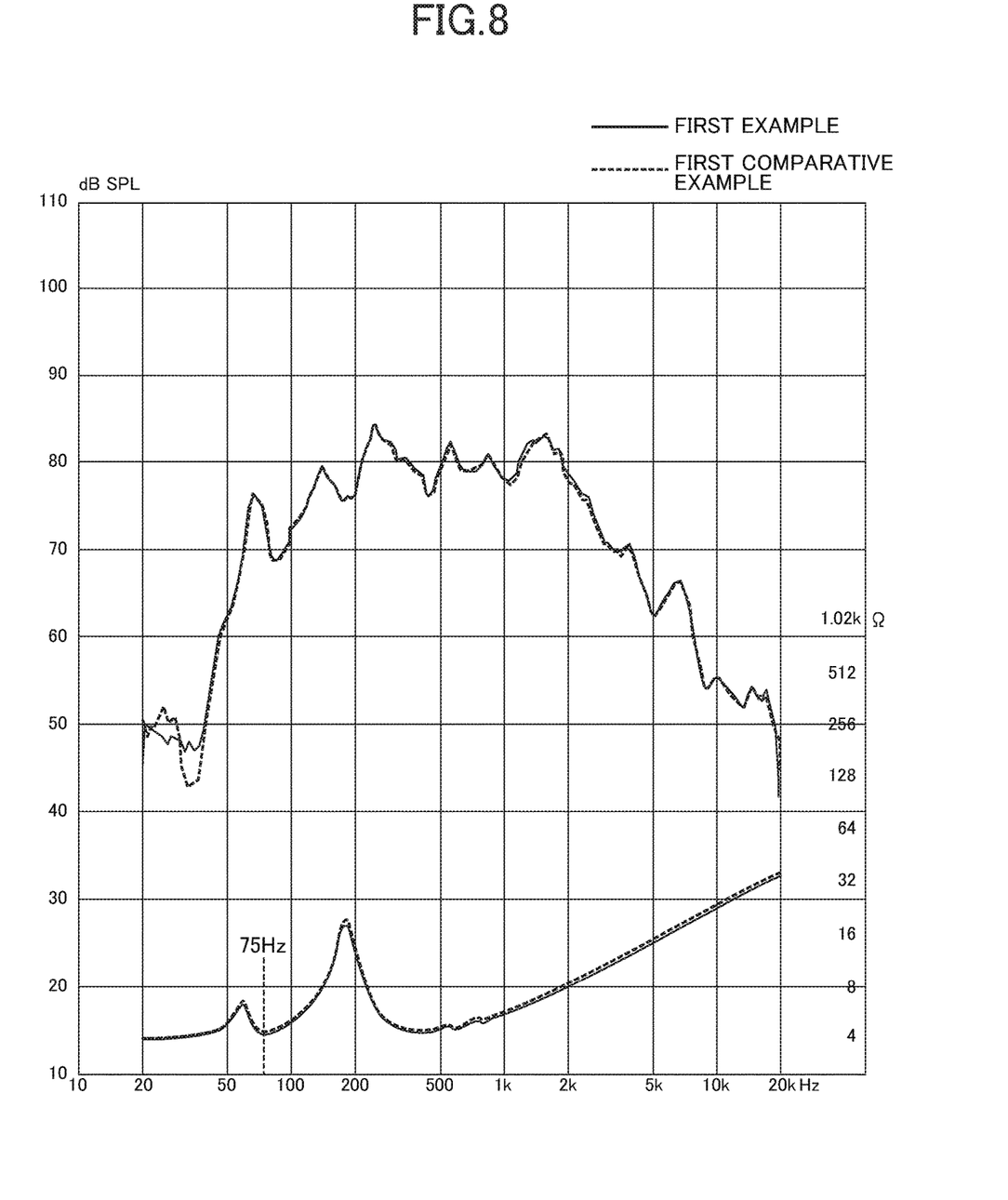
FIG. 8 is graphs showing one example of sound pressure properties and impedance properties relating to a first example of the speaker device and a first comparative example of the speaker device.
Figure 9:
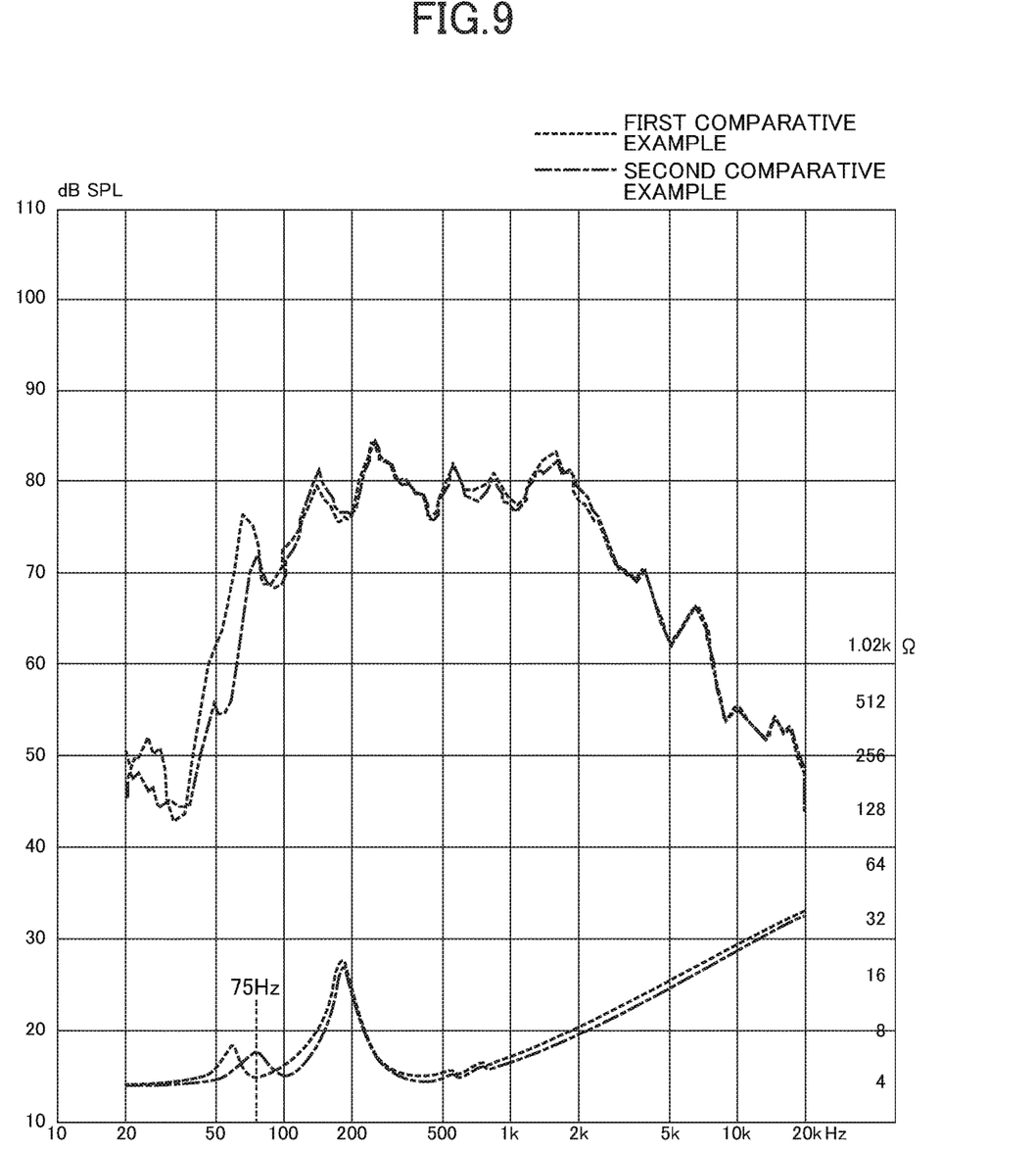
FIG. 9 is graphs showing one example of sound pressure properties and impedance properties relating to the first comparative example of the speaker device and a second comparative example of the speaker device.

FIG. 8 is graphs showing sound pressure properties and impedance properties. The upper graph in FIG. 8 shows, by way of example, sound pressure properties relating to an exemplary embodiment of the speaker device 140 (i.e., first example) and to a comparative example of the speaker device 140 (i.e., first comparative example). The lower graph in FIG. 8 shows, by way of example, the impedance properties relating to the first example and the comparative example. FIG. 9 is exemplary graphs showing sound pressure properties and impedance properties relating to the first comparative example of the speaker device 140 and a second comparative example of the same. In each of FIGS. 8 and 9, the solid line indicates the first example, the dashed line indicates the first comparative example, and the dot-dashed line indicates the second comparative example.

In the first example, the natural frequency of a Helmholtz resonance is designed to be about 75 Hz. The first comparative example is different from the first example in that the pressure regulating mechanism 301 is not provided, that is, the opening 601 and breathable member 602 are not provided. The second comparative example is different from the first example in that the pressure regulating mechanism 301 has the opening 601 alone, and has no breathable member 602.

As shown in FIG. 9, there are some changes in the impedance properties in the second comparative example when compared to the first comparative example, where the duct 203 has no opening 601. In the second comparative example, the opening 601 is not covered with the breathable member 602. The effective duct length hence changes, thus changing the natural frequency of a Helmholtz resonance, as earlier described, when compared to that in the first comparative example. In the second comparative example, the natural frequency of a Helmholtz resonance changes to about 100 Hz. In the second comparative example, the sound pressure properties changes as well, along with a change in the natural frequency of a Helmholtz resonance, when compared to those in the first comparative example.

In the first example by contrast, the impedance properties and sound pressure properties do not substantially change, as shown in FIG. 8, when compared to those in the first comparative example, where no pressure regulating mechanism 301 is provided in the duct 203. That is, the graph reveals that covering the opening 601 of the duct 203 with the breathable member 602 prevents a change in the natural frequency of a Helmholtz resonance, by extension, a change in the acoustic properties of the speaker device 140.

Figure 10:
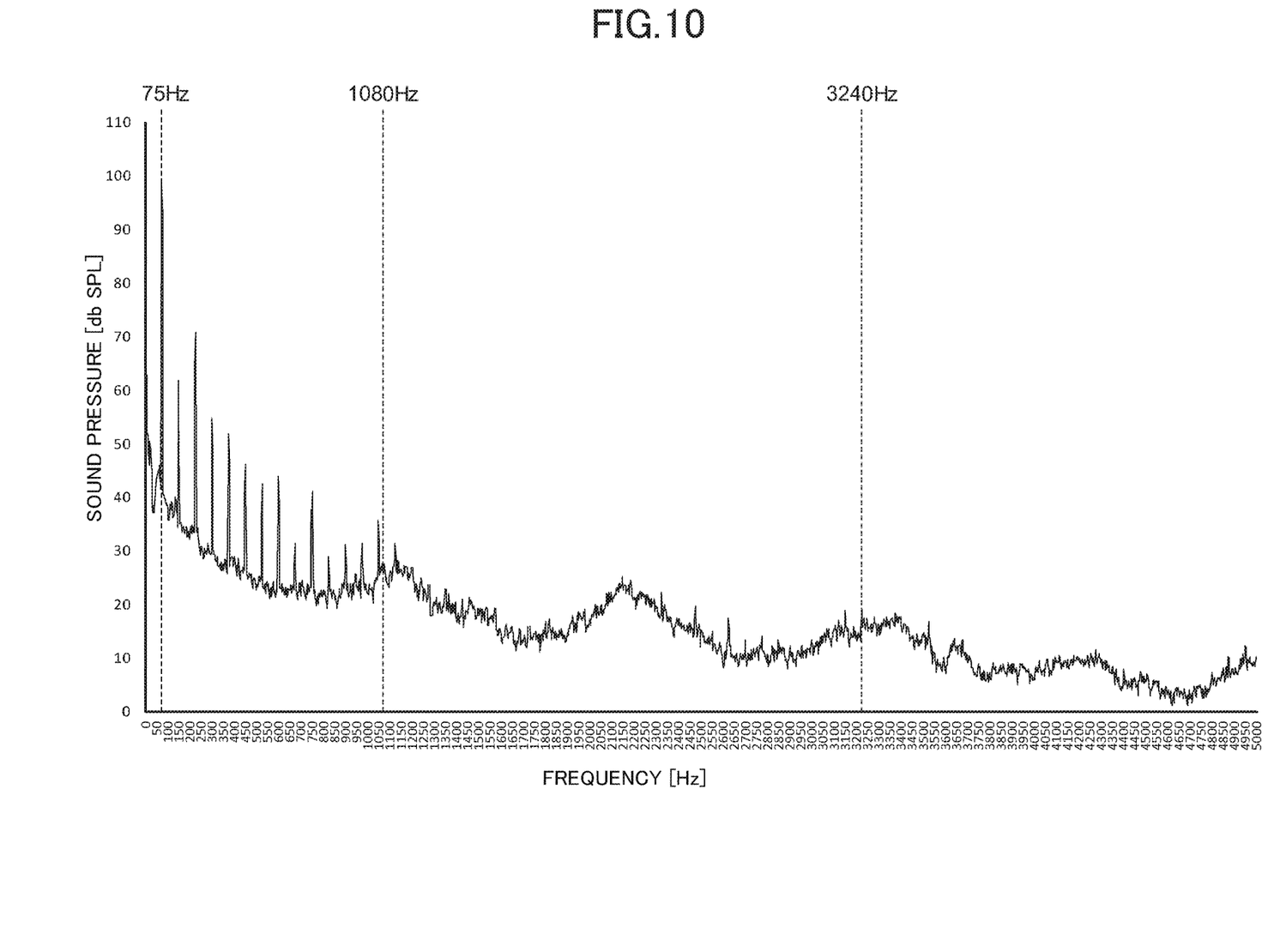
FIG. 10 is a graph showing an exemplary frequency analysis of a sound that is output when a particular single sound (i.e., a sound with a particular frequency) is input to the speaker in the first example of the speaker device.
Figure 11:
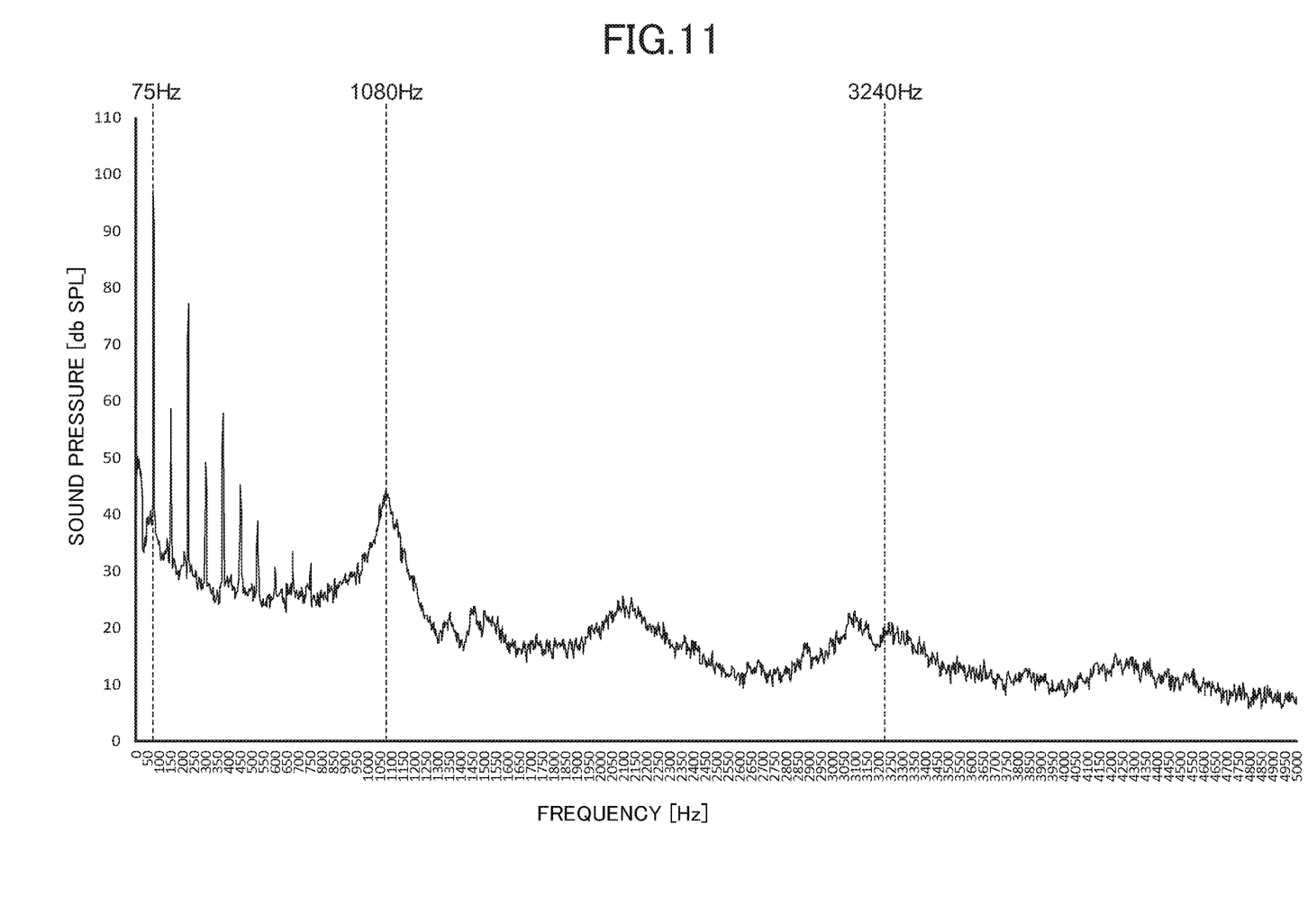
FIG. 11 is a graph showing an exemplary frequency analysis of a sound that is output when a particular single sound (i.e., a sound with a particular frequency) is input to the speaker in the first comparative example of the speaker device.

FIG. 10 is a graph showing an exemplary frequency analysis of a sound that is output when a single particular sound (i.e., a sound with a particular frequency) is input to the speaker in the first example. FIG. 11 is a graph showing an exemplary frequency analysis of a sound that is output when a single particular sound (i.e., a sound with a particular frequency) is input to the speaker in the first comparative example. In the first example and first comparative example, the duct length is about 15.7 cm, the frequency of a fundamental vibration of a natural vibration of an air column is 1080 Hz, the frequency of a natural vibration of a $2^{nd}$-order harmonic is 2160 Hz, and the frequency of a natural vibration of a $3^{rd}$-orfer harmonic is 3240 Hz. In the first example and first comparative example, the frequency of the particular single sound is 75 Hz, which is the natural frequency of a Helmholtz resonance in a speaker device.

FIGS. 10 and 11 demonstrate that the sound pressure of the fundamental vibration (at 1080 Hz) in the natural vibration of the air column in the first example is smaller than that in the first comparative example by about 18 dB. FIGS. 10 and 11 also demonstrate that the sound pressure of the $3^{rd}$-order harmonic (at 3240 Hz) in the first example is smaller than that in the first comparative example by about 4 dB. That is, the fundamental vibration and the tube resonance sound of an odd-numbered-order harmonic are smaller than those in the first comparative example, where no pressure regulating mechanism is provided.

Second Preferred Embodiment

A second preferred embodiment will be described. Descriptions similar to those in the first preferred embodiment will not be elaborated upon. The second preferred embodiment is different from the first preferred embodiment in that part of a rear case and part of a front case constitute a duct, and that a pressure regulating mechanism has an opening exposed outside a speaker box. The second preferred embodiment is also different from the first preferred embodiment in that a breathable member is disposed in a dent in the duct.

Figure 12:
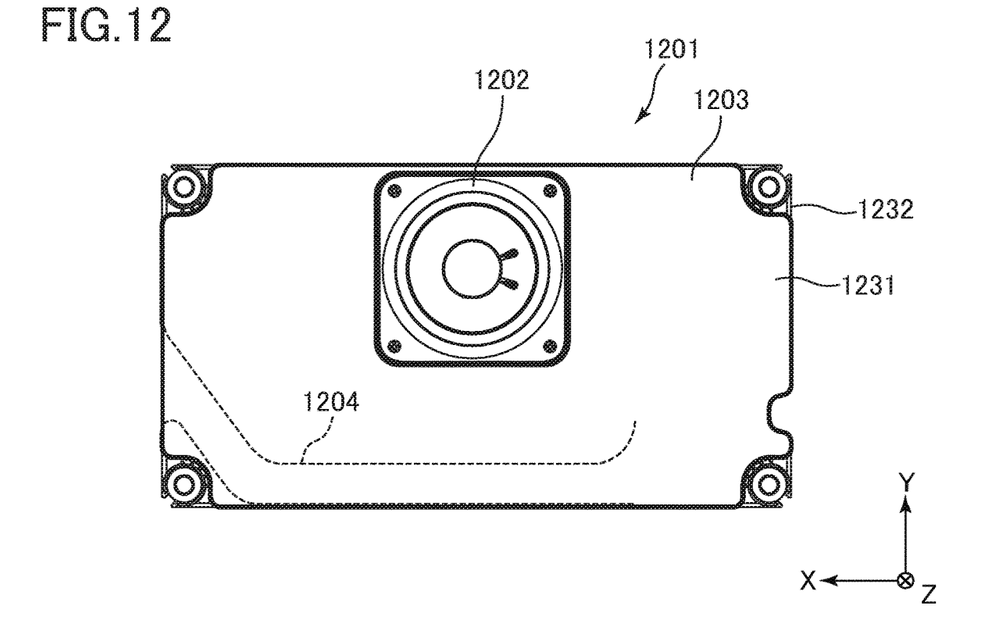
FIG. 12 schematically illustrates the configuration of a speaker device according to a second preferred embodiment.
Figure 13:
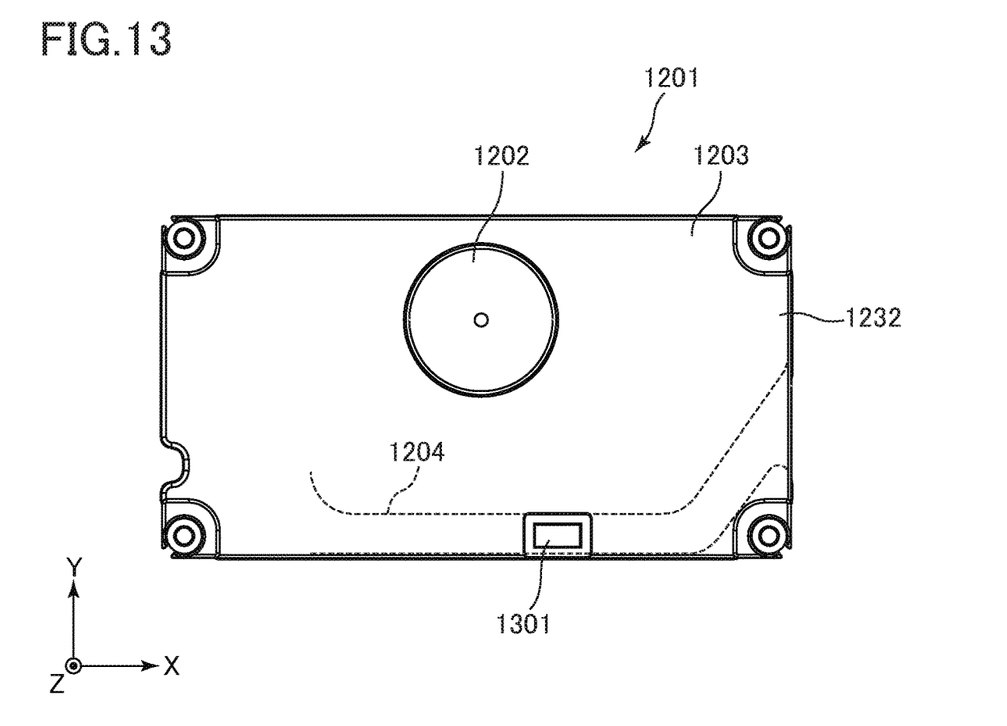
FIG. 13 schematically illustrates the configuration of the speaker device according to the second preferred embodiment.

FIGS. 12 and 13 schematically illustrate the configuration of a speaker device 1201 according to the second preferred embodiment. FIG. 12 illustrates the speaker device 1201 viewed from the −Z-direction, and FIG. 13 illustrates the speaker device 1201 viewed from the +Z-direction. The speaker device 1201 includes a speaker unit 1202, a speaker box 1203, and a duct 1204. The duct 1204 is provided with a pressure regulating mechanism 1301 (c.f., FIG. 13). In the example in FIGS. 12 and 13, the duct 1204 extends along the wall of the speaker box 1203 in the −Y-direction. The duct 1204 has one end in the X-direction (i.e., an end in the −X-direction) that is open within the speaker box 1203, and has the other end in the X-direction (i.e., an end in the +X-direction) that is connected to the outside of the speaker box 1203. The duct 1204 communicates together the interior and exterior of the speaker box 1203.

The speaker unit 1202 is attached to the speaker box 1203 with the direction of sound output oriented in the −Z-direction. The speaker box 1203 includes a front case 1231 in the −Z-direction, and a rear case 1232 in the +Z-direction. The speaker device 1201 is attached to the chassis of the television set 101, with the rear case 1232 facing the display unit 110 of the television set 101 and with the front case 1231 facing the rear cabinet 103.

Figure 14:
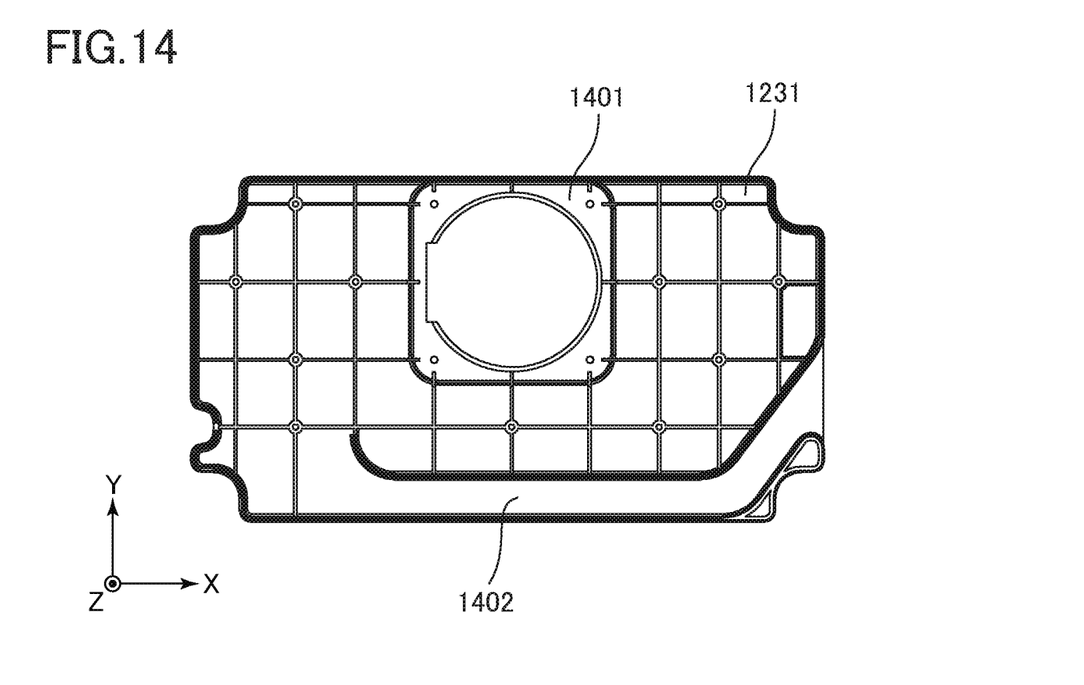
FIG. 14 schematically illustrates the configuration of a front case of the speaker device according to the second preferred embodiment.

FIG. 14 schematically illustrates the configuration of the front case 1231 viewed from the +Z-direction. The front case 1231 includes an attachment portion 1401 for attaching the speaker unit 1202, and a front portion 1402 that constitutes a part of the duct 1204 in the −Z-direction. The attachment portion 1401 has an opening from which the sound output surface of the speaker unit 1202 is exposed to the outside of the speaker box 1203 when the speaker unit 1202 is attached to the attachment portion 1401.

Figure 15:
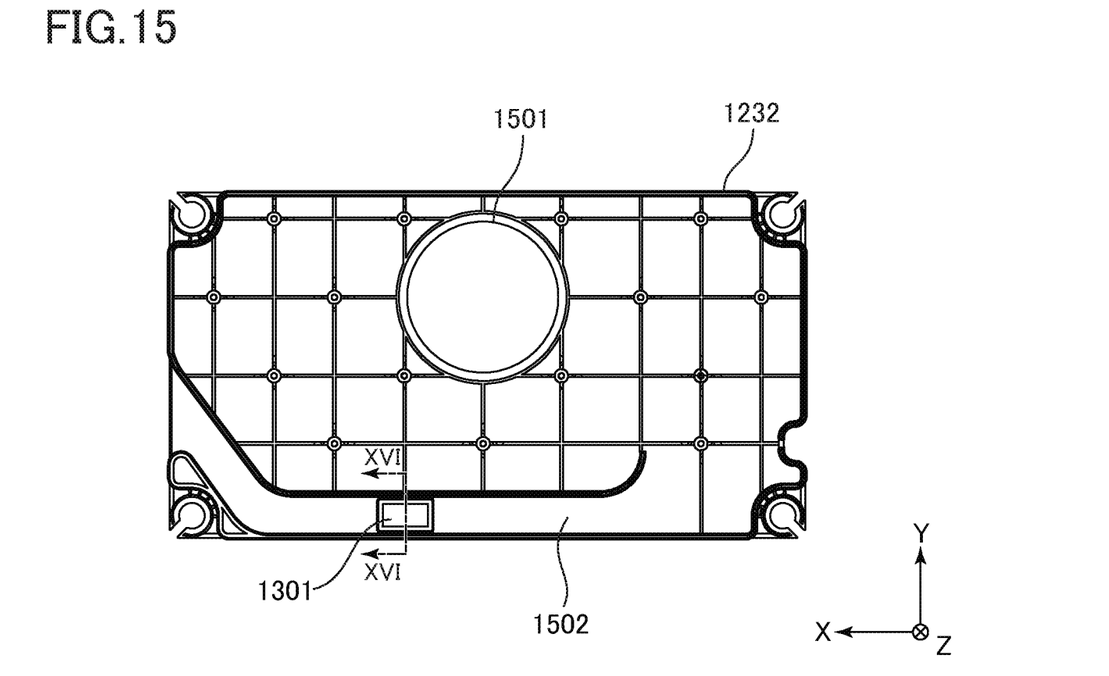
FIG. 15 schematically illustrates the configuration of a rear case of the speaker device according to the second preferred embodiment.

FIG. 15 schematically illustrates the configuration of the rear case 1232 viewed from the −Z-direction. The rear case 1232 includes an attachment portion 1501 for attaching the speaker unit 1202, and a rear portion 1502 that constitutes a part of the duct 1204 in the +Z-direction. The attachment portion 1501 has an opening into which a surface opposite the sound output surface of the speaker unit 1202 is partly inserted when the speaker unit 1202 is attached to the attachment portion 1501. The rear portion 1502 is provided with the pressure regulating mechanism 1301. In the example in FIG. 15, the pressure regulating mechanism 1301 is disposed at a center portion between one end and the other end of the duct 1204.

Figure 16:
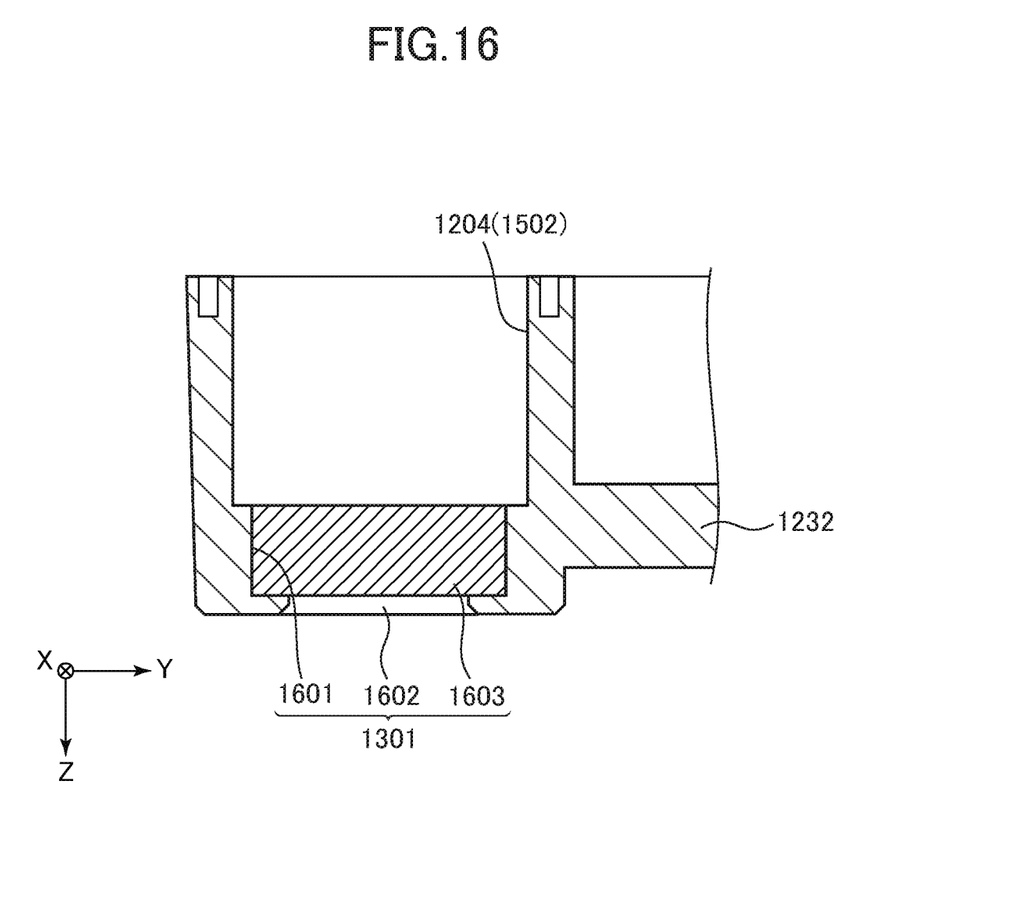
FIG. 16 is a schematic cross-sectional view taken along line XVI-XVI in FIG. 15.

FIG. 16 is a schematic cross-sectional view taken along line XVI-XVI in FIG. 15. As illustrated in FIG. 16, the pressure regulating mechanism 1301 has a dent 1601, an opening 1602, and a breathable member 1603. The dent 1601 extends from the interior toward exterior of the duct 1204. That is, the dent 1601 is provided in such a manner that the surface of the rear portion 1502 of the duct 1204 in the +Z-direction is partly dented in the Z-direction, as illustrated in FIG. 16. The opening 1602 is disposed at the bottom of the dent 1601. The breathable member 1603 is made of nonwoven fabric for instance. The breathable member 1603 is disposed in the dent 1601, and covers the opening 1602.

The thickness of the breathable member 1603 is substantially the same as the depth of the dent 1601 for instance. That is, in the Z-direction, the surface of the breathable member 1603 in the −Z-direction is disposed in the substantially same location as the inner surface of the duct 1204. Placing the breathable member 1603 in this way can prevent asperities on the inner surface of the duct 1204, by extension, prevent a change in the acoustic properties of the speaker device 1201. For instance, a turbulent flow can be prevented that results from the asperities on the inner surface of the duct 1204; by extension, an abnormal sound can be prevented that results from the turbulent flow. In addition, part of the breathable member 1603 protruded to the duct interior can prevent decrease in the sound wave within the duct, and can prevent reduction in the sound pressure level of a sound that is output from the duct 1204. Further, the depth of the dent 1601 needs to be set, as appropriate, according to the thickness of the breathable member 1603. The position of the surface of the breathable member 1603 in the +Z-direction is easy to adjust.

Modifications

A speaker device and display device according to one aspect of the present invention are not limited to those in the foregoing preferred embodiments. Configurations obtained by various modifications are also included in one aspect of the present invention.

The pressure regulating mechanism, although, in the foregoing preferred embodiments, having an opening (i.e., third opening) and a breathable member covering the opening, may be configured in any other manner. For instance, the pressure regulating mechanism may have the third opening and a cover covering at least part of the third opening. Covering at least part of the third opening with the cover can prevent a pressure fluctuation within the duct and reduce a tube resonance sound, while preventing a change in the natural frequency of a Helmholtz resonance. Other than the breathable member, the cover may be, for instance, a flexible member deformable according to a change in the internal pressure of the duct. The cover may also be an elastic member or elastic film that undergoes elastic deformation according to a change in the internal pressure of the duct. Deforming the cover covering at least part of the third opening in accordance with a change in the internal pressure of the duct can prevent a pressure fluctuation within the duct and reduce a tube resonance sound.

The third opening may not be covered with the cover. Setting, as appropriate, the size of the third opening prevents a pressure fluctuation within the duct to reduce a tube resonance sound, while preventing a change in the natural frequency of a Helmholtz resonance, and can prevent a change in the natural frequency of the Helmholtz resonance.

Although there is a single third opening, there may be multiple third openings. For instance, multiple third openings may be provided to correspond to a node of a fundamental vibration of a natural vibration of an air column, and to correspond to a location around the node. In this case, the third openings each need to be a through-hole having a diameter necessary to let air pass inside and outside the speaker box, according to a change in the internal pressure resulting from the natural vibration of the air column. The through-hole preferably has such a small diameter as to fall within the aforementioned range, so that a change in the natural frequency of a Helmholtz resonance can be prevented.

Although the aforementioned preferred embodiments have described that there is one pressure regulating mechanism provided in the center portion of the duct, multiple pressure regulating mechanisms may be provided between both ends of the duct. For instance, placing a pressure regulating mechanism in a location that corresponds to a node of a $2^{nd}$-order harmonic can reduce the $2^{nd}$-order harmonic of a tube resonance sound.

What is claimed is:

1. A speaker device comprising:
   a speaker unit configured to output a sound;
   a speaker box covering at least a part of a back surface of the speaker unit; and
   a duct comprising a first opening that is open within the speaker box, and a second opening opposite the first opening, the duct communicating together an interior and exterior of the speaker box via the first and second openings,
   wherein the duct further comprises a third opening disposed in a midway location between the first and second openings and exposed outside the speaker box.

2. The speaker device according to claim 1, wherein the third opening is disposed in the midway location that corresponds to where a vibration node of a natural vibration of an air column that occurs within the duct is located.

3. The speaker device according to claim 2, wherein the third opening is disposed in the midway location that corresponds to where a vibration node of a fundamental vibration of the natural vibration of the air column is located.

4. The speaker device according to claim 1, wherein the third opening is disposed in a center portion between the first and second openings.

5. The speaker device according to claim 1, further comprising a cover covering at least a part of the third opening.

6. The speaker device according to claim 5, wherein
   the duct comprises a dent dented from an interior toward exterior of the duct,
   the third opening is disposed at a bottom of the dent, and
   the cover is disposed in the dent.

7. The speaker device according to claim 5, wherein the cover comprises a breathable member.

8. The speaker device according to claim 7, wherein the breathable member comprises a nonwoven fabric.

9. A display device comprising:
   the speaker device according to claim 1; and
   a display unit configured to display an image.

10. The speaker device according to claim 1, wherein
    the speaker unit has a sound output surface, and
    the sound output surface and the third opening are disposed on surfaces of the speaker box different from each other.

11. A speaker device comprising:
    a speaker unit configured to output a sound;
    a speaker box covering at least a part of a back surface of the speaker unit;
    a duct comprising a first opening that is open within the speaker box, and a second opening opposite the first opening, the duct communicating together an interior and exterior of the speaker box via the first and second openings; and
    a pressure regulating mechanism disposed in a midway location between the first and second openings of the duct and exposed outside the speaker box, the pressure regulating mechanism being configured to reduce a change in an internal pressure of the duct in the midway location.

12. A speaker device comprising:
    a speaker unit configured to output a sound;
    a speaker box covering at least a part of a back surface of the speaker unit; and
    a duct comprising a first opening that is open within the speaker box, and a second opening opposite the first opening, the duct communicating together an interior and exterior of the speaker box via the first and second openings, wherein
    the duct further comprises a third opening disposed in a midway location between the first and second openings,
    the third opening is disposed in the midway location that corresponds to where a vibration node of a natural vibration of an air column that occurs within the duct is located, and
    the third opening is disposed in the midway location that corresponds to where a vibration node of a fundamental vibration of the natural vibration of the air column is located.

* * * * *